United States Patent
Li et al.

(10) Patent No.: US 11,860,098 B1
(45) Date of Patent: Jan. 2, 2024

(54) METHOD AND DEVICE FOR THREE-DIMENSIONAL OBJECT SCANNING WITH INVISIBLE MARKERS

(71) Applicant: Tencent America LLC, Palo Alto, CA (US)

(72) Inventors: Xinyuan Li, South Setauket, NY (US); Yu Ji, Palo Alto, CA (US); Yanchen Liu, Palo Alto, CA (US); Xiaochen Hu, Palo Alto, CA (US); Changxi Zheng, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/154,754

(22) Filed: Jan. 13, 2023

(51) Int. Cl.
*G01N 21/64* (2006.01)

(52) U.S. Cl.
CPC ..... *G01N 21/6456* (2013.01); *G01N 21/6428* (2013.01); *G01N 2021/6441* (2013.01); *G01N 2021/6495* (2013.01); *G01N 2021/6497* (2013.01)

(58) Field of Classification Search
CPC ........... G01N 21/6456; G01N 21/6428; G01N 2021/6441; G01N 2021/6495; G01N 2021/6497
See application file for complete search history.

(56) References Cited

U.S. PATENT DOCUMENTS

| | | | | |
|---|---|---|---|---|
| 7,394,053 | B2* | 7/2008 | Frangioni | A61B 6/00 250/226 |
| 2006/0249689 | A1* | 11/2006 | Eustergerling | A61B 5/0059 250/458.1 |
| 2010/0020070 | A1* | 1/2010 | Hart | G01B 11/0658 356/630 |
| 2013/0218531 | A1* | 8/2013 | Deichmann | A61C 5/77 703/1 |
| 2014/0028667 | A1* | 1/2014 | Spruck | G06T 19/20 345/419 |
| 2016/0377545 | A1* | 12/2016 | Wang | G01N 21/6456 250/459.1 |
| 2017/0228924 | A1* | 8/2017 | Myyrylainen | G06T 15/20 |
| 2017/0309063 | A1* | 10/2017 | Wang | G01N 29/2418 |
| 2017/0319057 | A1* | 11/2017 | Inglese | A61B 1/0638 |
| 2018/0270474 | A1* | 9/2018 | Liu | A61B 6/508 |

(Continued)

OTHER PUBLICATIONS

3dMDhand™ System Series, https://3dmd.com/products/#https://3dmd.com/products/#!/hand.

(Continued)

*Primary Examiner* — Marcus H Taningco

(74) *Attorney, Agent, or Firm* — ANOVA LAW GROUP PLLC

(57) ABSTRACT

A three-dimensional (3D) object scanning method includes: controlling, when an invisible light source is off, a first camera device to capture a first image of the target object; and controlling, when the invisible light source is on, a second camera device to capture second images of the target object from a plurality of viewing angles. The target object is painted with invisible markers that are invisible to the first camera device when the invisible light source is off. The invisible markers are visible to the second camera device upon absorbing a light emitted by the invisible light source. The second images are used to determine 3D information of the target object.

26 Claims, 4 Drawing Sheets

(56) References Cited

U.S. PATENT DOCUMENTS

| | | | |
|---|---|---|---|
| 2019/0059736 A1* | 2/2019 | Maier-Hein | A61M 5/19 |
| 2020/0098122 A1* | 3/2020 | Dal Mutto | G06T 17/00 |
| 2021/0383147 A1* | 12/2021 | Rajaraman | G06V 40/172 |
| 2022/0092770 A1* | 3/2022 | DaCosta | A61B 5/0091 |
| 2022/0108461 A1* | 4/2022 | Dacosta | G01S 17/86 |

OTHER PUBLICATIONS

Javier Romero, et al., "Embodied Hands: Modeling and Capturing Hands and Bodies Together", ACM Transactions on Graphics, vol. 36, No. 6, Article 245. Publication date: Nov. 2017.
Gyeongsik Moon, et al., "A Dataset and Baseline for 3D Interacting Hand Pose Estimation from a Single RGB Image". InterHand2.6M, ECCV Aug. 21, 2020.

\* cited by examiner

```
┌─────────────────────────────────────────────────────────────┐
│ Controlling, when an invisible light source is off, a first │
│ camera device to capture a first image of the target object │
│                          S302                               │
└─────────────────────────────────────────────────────────────┘
                              │
┌─────────────────────────────────────────────────────────────┐
│ Controlling, when the invisible light source is on, a second│
│ camera device to capture second images of the target object │
│         from a plurality of viewing angles  S304            │
└─────────────────────────────────────────────────────────────┘
```

FIG. 3

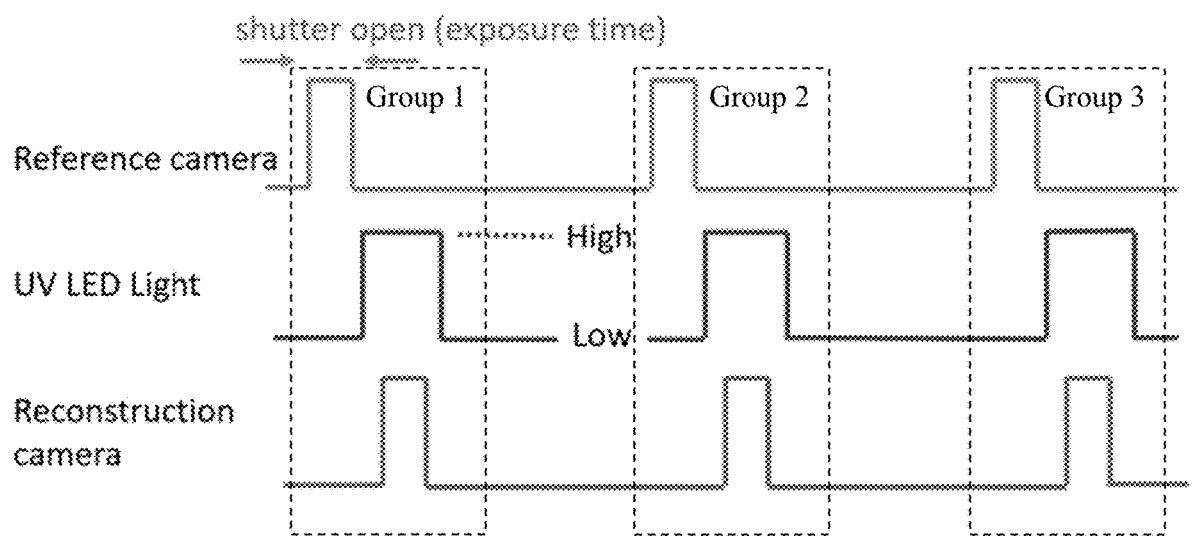

FIG. 4

METHOD AND DEVICE FOR THREE-DIMENSIONAL OBJECT SCANNING WITH INVISIBLE MARKERS

FIELD OF THE TECHNOLOGY

This application relates to the field of object scanning technologies and, specifically, to a method and device for three-dimensional (3D) object scanning with invisible markers.

BACKGROUND

Existing marker-based motion capture technology requires a person to wear a special garment (e.g., gloves) with motion capture markers to capture, track and recover a pose or a motion of a human body or body part (e.g., hand). These motion capture markers can reflect bright color in motion cameras, so a motion capture system can detect the markers. With multiple motion cameras, the motion capture system can recover 3D positions of the markers, and further recover the pose of the human body or body part. Since the person needs to wear the special garment, natural photos of the human body or body part cannot be captured using a normal camera. Therefore, the motion capture system can only produce the pose but not the shape of the human body or body part. Further, it is very difficult to obtain an accurate registration between the pose and the natural image.

The disclosed methods and systems are directed to solve one or more problems set forth above and other problems.

SUMMARY

One aspect of the present disclosure provides a three-dimensional (3D) object scanning method. The method includes: controlling, when an invisible light source is off, a first camera device to capture a first image of the target object; and controlling, when the invisible light source is on, a second camera device to capture second images of the target object from a plurality of viewing angles. The target object is painted with invisible markers that are invisible to the first camera device when the invisible light source is off. The invisible markers are visible to the second camera device upon absorbing a light emitted by the invisible light source. The second images are used to determine 3D information of the target object.

Another aspect of the present disclosure provides a 3D object scanner which includes a first camera device, a second camera device, an invisible light source, and a controller. The target object is painted with invisible markers that are invisible to the first camera device when the invisible light source is off. The invisible markers are visible to the second camera device upon absorbing a light emitted by the invisible light source. The controller is configured to: control an on/off status of the invisible light source; control, when the invisible light source is off, the first camera device to capture a first image of the target object; and control, when the invisible light source is on, the second camera device to capture second images of the target object from a plurality of viewing angles. The second images are used to determine 3D information of the target object.

Another aspect of the present disclosure provides a non-transitory storage medium storing computer instructions. The computer instructions, when executed by a processor, cause the processor to perform: controlling an on/off status of an invisible light source; controlling, when the invisible light source is off, a first camera device to capture a first image of the target object; and controlling, when the invisible light source is on, a second camera device to capture second images of the target object from a plurality of viewing angles. The target object is painted with invisible markers that are invisible to the first camera device when the invisible light source is off. The invisible markers are visible to the second camera device upon absorbing a light emitted by the invisible light source. The second images are used to determine 3D information of the target object.

Other aspects of the present disclosure can be understood by those skilled in the art in light of the description, the claims, and the drawings of the present disclosure.

BRIEF DESCRIPTION OF THE DRAWINGS

FIG. 3 illustrates a flowchart of a scanning process consistent with certain embodiments of the present disclosure.

FIG. 4 illustrates a scheme of trigger signals consistent with certain embodiments of the present disclosure.

DETAILED DESCRIPTION

Figure 1:
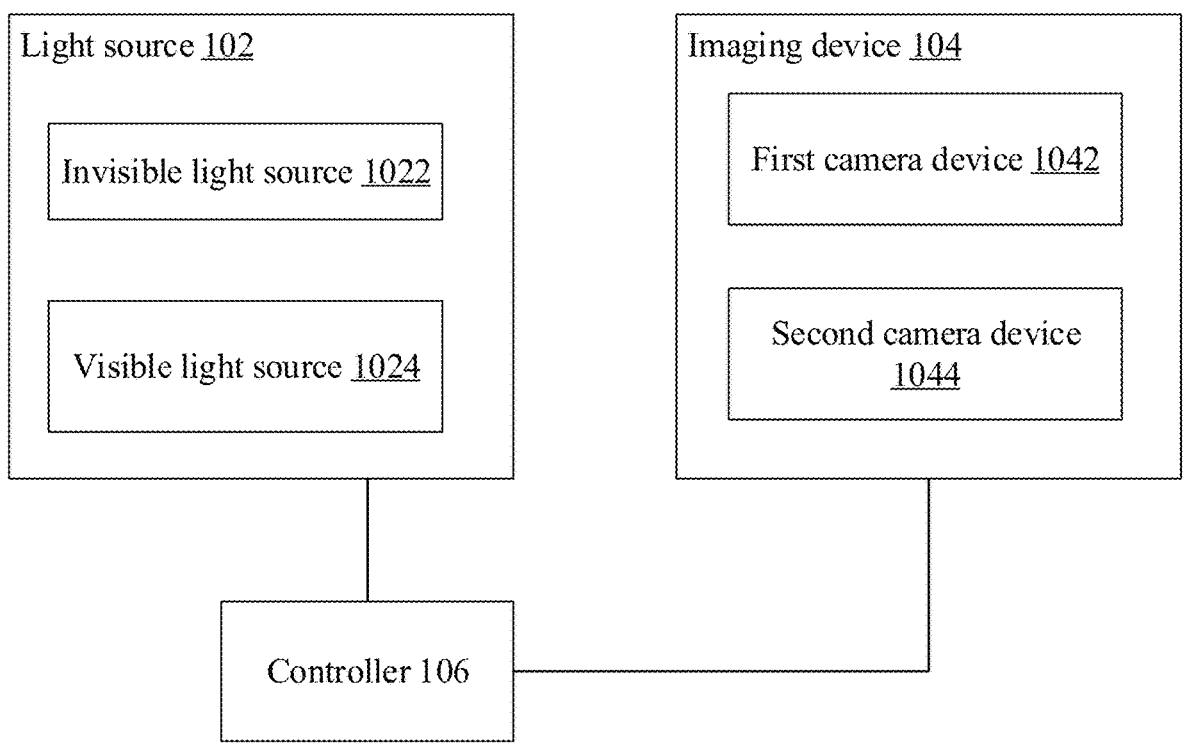
FIG. 1 illustrates a structural diagram of a three-dimensional object scanner consistent with embodiments of the present disclosure.

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure.

The present disclosure provides a three-dimensional (3D) object scanning system that can digitalize a physical object. The physical object can be, for example, a body part such as a human hand. The 3D scanning system includes a scanner that can capture and reconstruct dynamic 3D shape and pose of a target object painted with invisible markers. An "invisible marker", as used herein, may refer to a marker that is invisible to a camera under a first lighting condition (e.g., normal lighting condition with visible wavelength), and visible to the camera under a second lighting condition (e.g., specific lighting condition with wavelength outside visible spectrum). During a capture process, the marker visibility can be switched so the camera is made to-see or not-to-see the markers as desired by changing the lighting condition.

According to embodiments of the present disclosure, images of the object with markers can be used to estimate more accurate geometry model, shape and pose of the object, and images of the object in natural lighting can be simultaneously captured. The 3D model generated from the captured images may include point clouds or mesh. The 3D model can be directly used in CG animation industries. In addition, the 3D scanning system can automatically generate high precision labeled data for learning-based pose and shape estimation from images. For example, the training data can include output pairs of reconstructed pose data and natural images of the corresponding poses, which can greatly benefit learning-based pose estimation, because high accurate train data for pose estimation is very difficult to obtain in existing technologies. The training data can be used in gesture recognition (e.g., hand gesture recognition) in many different areas, including virtual reality (VR), augmented reality (AR) applications, and sign language recognition, etc.

In some embodiments, the invisible marker is implemented by applying a fluorescent dye to a surface of the target object in certain patterns. The fluorescent dye can be invisible or appear as transparent under normal lighting conditions. For example, when the dye is applied to a skin of a scanning target, neither human eye nor a camera can distinguish it from the skin. When a light in specific wavelength (usually outside visible spectrum) is incident on the scanning target, the dye becomes visible and emits a certain wavelength light. Accordingly, by switching an on/off status of the light with specific wavelength, a natural looking of the scanning target or an image of the scanning target with markers can be captured. For example, an ultraviolet (UV) LED light source can be used (e.g., wavelength at around 365 nm), and the fluorescent dye absorbs the light around 365 nm wavelengths.

FIG. 1 illustrates a structural diagram of a three-dimensional object scanner consistent with embodiments of the present disclosure. As shown in FIG. 1, the 3D object scanner 100 includes a light source 102, an imaging device 104, and a controller 106. The light source 102 and the imaging device 104 are respectively connected to the controller 106 through a wired connection or a wireless connection. The wireless connection may be established based on any suitable communication protocols. The light source 102 is configured to emit a light onto a target object. The emitted light may be an invisible light, e.g., a light having a wavelength outside of a visible light spectrum. The starting and stopping of the light emitting by the light source 102 may be implemented in response to a control signal from the controller 106. The imaging device 104 is configured to capture an image of the target object. The imaging device 104 may initiate the image capturing in response to a trigger signal from the controller 106. The images of the target object may be captured under different lighting conditions. The controller 106 is configured to control a timing of starting or stopping to emit a light by the lighting source 102, and a timing of capturing an image of the target object using the imaging device 104. In other words, the controller 106 is configured to control a lighting condition provided by the light source 102 and to trigger the imaging device 104 to capture an image of the target object.

The light source 102 includes an invisible light source 1022. The target object is painted with invisible markers. The markers can be invisible under a first lighting condition. The first lighting condition may be a uniform lighting condition with visible light. The markers can become visible under a second lighting condition (e.g., upon absorbing a light emitted by the invisible light source 1022). The second lighting condition can also be referred as invisible lighting condition, i.e., light emitted on the target object having a wavelength outside of a visible light spectrum. The wavelength of the light emitted by the invisible light source 1022 is in an excitation wavelength range of a fluorescent dye of the invisible markers. For example, a wavelength of the light emitted by the invisible light source 1022 is in an ultraviolet light spectrum and/or an infrared light spectrum.

In some embodiments, the imaging device 104 includes a first camera device 1042 and a second camera device 1044. The first camera device 1042 is configured to capture a first image of a target object under the first lighting condition. As used herein, the first camera device 1042 may also be referred as reference camera. The first image may be referred as reference image or natural image. The second camera device 1044 is configured to capture a second image of the target object from a plurality of viewing angles under the second lighting condition. As used herein, the second camera device 1044 may also be referred as reconstruction camera. The second image may be referred as reconstruction image, as the second image is used in reconstructing and obtaining three-dimensional information of the target object. The second image may also be referred as marked image as the markers are shown in the second image due to being lit by the invisible light source.

In some embodiments, the second camera device 1044 includes a plurality of second cameras configured to capture images of the target object from a plurality of viewing angles under the second lighting condition. The images of the target object from the different viewing angles can be used in reconstructing a 3D model of the target object. The plurality of second cameras may have fixed relative position relationships with each other. A density of the second cameras can affect an accuracy of the reconstructed 3D model. For example, the plurality of cameras may be disposed on a support structure. The support structure may have a rigid structure. The support structure may have a dome shape or a cylinder shape. A shape of a cross section of the support structure may be a circle, and a group of cameras can be distributed on a circumference of the cross section to cover different viewing angles at a same longitudinal position. Multiple groups of cameras may be arranged at multiple longitudinal positions, each group corresponding to the circumference of the cross section of a same longitudinal position. In some embodiments, a group of cameras on a same circumference of a cross section may be evenly distributed. For example, when the target object is a human hand, the longitudinal direction may be the same as the forearm. It can be understood that the cameras can be fixed on other structure(s) to reach similar location arrangements and capture images of the target object from different viewing angles.

In some embodiments, the first camera device 1042 may include one or more first cameras placed at any suitable position(s) to capture reference image(s) of the target object. For example, when the target object is a hand of a person, the first camera device 1042 may include a first camera placed in front of the hand to capture a front view image, and/or a first camera placed at or near the head to capture an image of the hand from the person's own perspective. In some embodiments, the first camera device 1042 may have a fixed relative position relationship with the second camera device 1044.

In some embodiments, a camera may belong to both the first camera device 1042 and the second camera device 1044. That is, a single camera may be configured to capture (e.g., in response to control signals from the controller 106) the first image under the first lighting condition at a first moment and the second image under the second lighting condition at a second moment.

In some embodiments, the invisible light source 1022 may include a plurality of lighting devices configured to emit invisible light and disposed at multiple locations in a space and configured to provide a uniform invisible lighting condition around the target object. The lighting devices may be, for example, infrared lights and/or ultraviolet (UV) lights. The lighting devices may be light-emitting diode (LED) lights.

In some embodiments, the light source 102 may further include a visible light source 1024 configured to provide a uniform visible lighting condition around the target object. The visible light source 1024 may include a plurality of lighting devices configured to emit visible light and disposed at multiple locations in a space. Lights emitted by the lighting devices of the visible light source 1024 may have a white color.

In some embodiments, a lighting device may belong to both the invisible light source 1022 and the visible light source 1024. That is, a single lighting device may be configured to emit (e.g., in response to control signals from the controller 106) a visible light at a first moment and an invisible light at a second moment.

In one embodiment, one or more lighting devices of the light source 102 may be fixed on a same support structure as one or more cameras of the imaging device 104. In another embodiment, one or more lighting devices of the light source 102 may be disposed on a structure separate from the support structure with the cameras. In some embodiments, a relative position relationship between the imaging device 104 and the light source 102 remains fixed during the whole scanning process of the target object.

In some embodiments, the controller 106 may include a processor. The processors may be implemented by using at least one hardware form of digital signal processing (DSP), a field-programmable gate array (FPGA), a programmable logic array (PLA), a central processing unit (CPU), a graphics processing unit (GPU), etc. The processor may include multiple cores for multi-thread or parallel processing. The controller 106 may include one or more of the processors. In some embodiments, the controller 106 may include communication means to send control/trigger signals to the imaging device 104 and the light source 102 respectively. In some embodiments, the communication means may also be configured to receive configuration of trigger/control signal scheme set by a user. In some embodiments, the communication means may also be configured to receive data from the imaging device 104, such as the captured images. The captured images and/or the trigger/control signal scheme may be stored in a memory coupled to the controller 106. In some embodiments, the controller 106 may be further configured to process the captured images to obtain 3D information of the target object. The 3D information of the target object may include 3D model, 3D shape, 3D pose, and/or tracked 3D motion of the target object. In some embodiments, the controller 106 may be integrated in a single device or may include multiple components disposed at different locations. In some embodiments, at least part of the controller 106 may be disposed on a same support structure as one or more cameras of the imaging device 104.

Figure 2A:
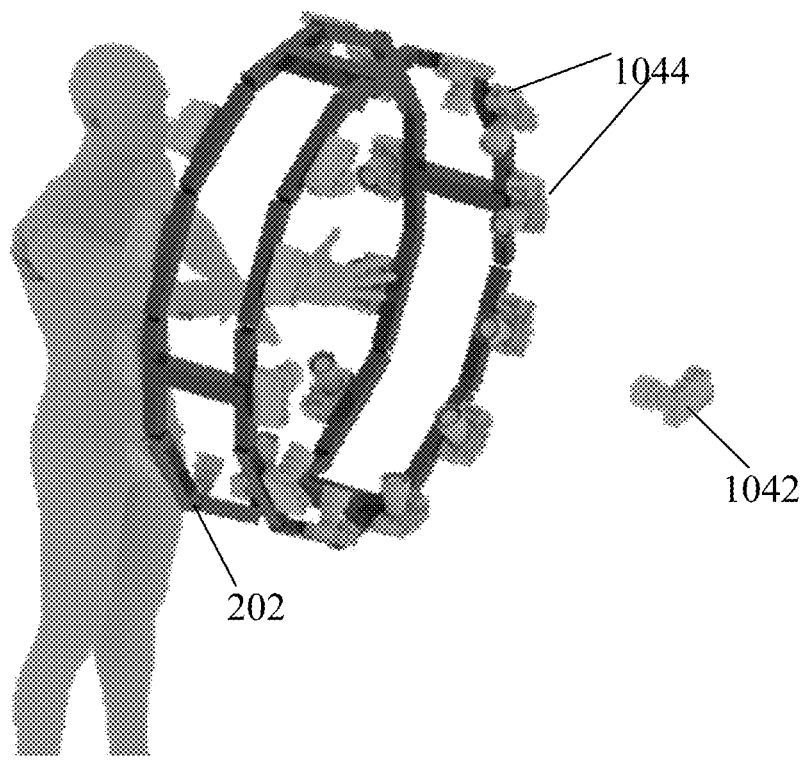
FIG. 2A illustrates an example 3D object scanning system consistent with certain embodiments of the present disclosure.
Figure 2B:
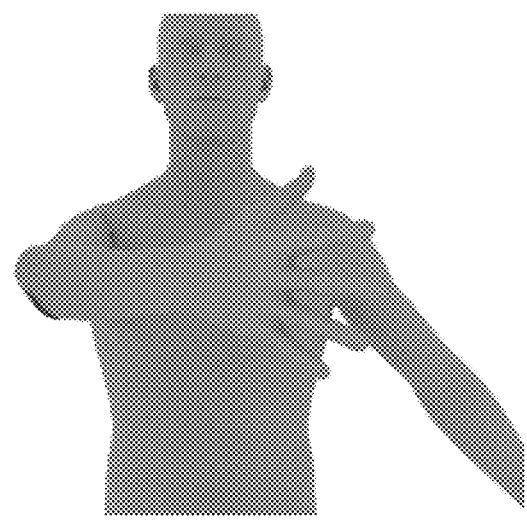
FIG. 2B illustrates an example front view image captured by the reference camera of the system shown in FIG. 2A.

FIG. 2A illustrates an example 3D object scanning system consistent with certain embodiments of the present disclosure. In some embodiments, the object scanning system as shown in FIG. 2A can be used to scan human hands. As shown in FIG. 2A, a cylinder shaped support structure 202 is provided to host cameras. In one example, a radius of the cylinder is about 0.8 m, and a capture area is 0.5 m×0.5 m×0.5 m. The system includes multiple high-speed cameras, LED panels, and UV LED light. The cameras are divided into two groups: one is for reconstruction and the other is for reference capture. The reconstruction cameras (e.g., second camera device 1044) are mounted on multiple rings of the cylinder and faced to the center. LED panels (e.g., visible light source 1024) are placed outside the cylinder to illuminate the entire scene uniformly. UV LED lights (e.g., invisible light source 1022) are placed next to the reconstruction cameras and point to the center region. These UV LEDs can be triggered (e.g., by the controller 106) to flash the scene at high speed. The reference camera (e.g., first camera device 1042) can be placed at the front to capture the normal front view. FIG. 2B illustrates an example front view image captured by the reference camera of the system shown in FIG. 2A.

FIG. 3 illustrates a flowchart of a scanning process consistent with certain embodiments of the present disclosure. The process can be performed by the 3D scanner 100 (e.g., the controller 106) as shown in FIG. 1, the example 3D scanning system as shown in FIG. 2A, and any other suitable scanner.

As shown in FIG. 3, the scanning process may include controlling, when an invisible light source is off, a first camera device to capture a first image of the target object (S302), and controlling, when the invisible light source is on, a second camera device to capture second images of the target object from a plurality of viewing angles (S304). It can be understood that steps S302 and S304 can be performed separately and a sequence of performing steps S302 and S304 can be adjusted based on custom settings. The timing of turning on and off the invisible light source (e.g., light source 1022), and the timing of triggering the first/second camera device (e.g., device 1042 and/or 1044) to capture images can be controlled according to the trigger signals from a processor (e.g., controller 106).

Before the scanning process, the target object (e.g., one or two hands) can be painted with patterns using fluorescent inks/dyes of one or more colors. The painted patterns are used as the invisible markers. That is, the fluorescent inks/dyes are invisible under the sunlight or regular LED but can emit lights with various colors under an invisible light (e.g., UV light). For example, a first fluorescent dye that emits green light and a second fluorescent dye that emits blue light can be used for a human hand target object, (e.g., to maximize the difference in hues between the color of skin and the markers under UV lights). In some embodiments, the fluorescent dyes are non-toxic and the peak excitation wavelengths are near 365 nm, and the invisible light source 1022 are all UV-A lights (with a wavelength in a range from 315 to 400 nanometers), which are in principle harmless to human beings. In some embodiments, near infrared (IR) fluorescent inks can be used for the invisible markers, which absorb IR light at one wavelength and emit IR light in another wavelength.

In some embodiments the invisible markers include multiple types of markers to indicate multiple different attributes of the target object. The different attributes of the target object may include at least one of: anatomical parts of the target object, skeleton or non-skeleton parts of the target object, or joint or non-joint parts of the target object. The invisible markers can be color coded and/or shape coded to, for example, differentiate between left and right hands, differentiate between joint and non-joint parts of a body part, etc. The shapes of the invisible markers can include dots, squares, triangles, and/or lines, etc. In some examples, different colors and shapes can both be used to create a unique pattern for identifying a corresponding attribute, such as blue dots to indicate joints, red lines to indicate skeleton, green triangles to indicate an anatomical part, etc.

In some embodiments, steps S302 and S304 can be repeated to capture multiple image sets of the target object in a plurality of capturing cycles, each image set including the first image and the second images corresponding to the capturing cycle. The image set may also be referred as a frame. Accordingly, movement and different poses of the target object can be recorded by the multiple image sets. In some embodiments, each capturing cycle may follow a same capturing sequence and trigger signal scheme. The time intervals between adjacent capturing cycles may be the same. In some embodiments, the 3D information of the target object reconstructed from the second images corresponding to one capturing cycle and the first image captured in the same capturing cycle can be used as a training sample in a learning-based image recognition model (e.g., hand gesture recognition). In the training sample, the first image is a training image, and the 3D information includes a ground truth (e.g., a 3D pose) that can be used as a label corresponding to the first image.

The first camera device 1042, the second camera device 1044, and the invisible light source 1022 can be triggered separately for operation. In one capturing cycle, a group of trigger signals can be generated. For example, the controller may generate a first trigger signal to control the first camera device to capture the first image of the target object, generate a second trigger signal to control the invisible light source to emit light for a duration, and generate a third trigger signal to control the second camera device to capture the second images of the target object within the duration indicated by the second trigger signal. Accordingly, the second images are captured within the duration that the invisible light source is on. In addition, a time interval between a first moment that the first trigger signal is generated and a second moment that the second trigger signal is generated is less than an interval threshold. The interval threshold can be within a couple of milli seconds. Accordingly, the status of the target object captured by the first camera device and the second camera device is practically the same.

In some embodiments, the motion of the target object can be captured in sequence. The frame rate can be as high as 60-75 fps depending on the lighting and camera bandwidth. For example, the controller 106 may generate 60-75 groups of trigger signals in one second. A frame, as used herein, may refer to a set of images captured in response to trigger signals of a same group. For example, when the scanning system includes 1 reference camera and 16 reconstruction cameras, each frame may include 1 natural image and 16 reconstruction images. When the target object is a hand or two hands, the capture can start with an open hand pose since it does not have any occlusion and is easy to register, and then some complex hand pose and motion can be performed and captured in multiple frames. The left and right hands can be captured together or separately.

The trigger signals can be generated in any suitable forms to accommodate the trigger requirement of the corresponding component. For example, the first and second camera devices can be configured to start capturing a scene containing the target object upon receiving a rising edge of a corresponding trigger signal, and the invisible light source 1022 is turned on when its corresponding trigger signal is at a high level. The invisible light source 1022 may be a LED light controlled by pulse-width modulation (PWM), and its raising time is in a scale of nanosecond.

FIG. 4 illustrates a scheme of trigger signals consistent with certain embodiments of the present disclosure. As shown in FIG. 4, three groups of trigger signals are repeated in a same pattern, each group including a trigger signal for the reconstruction camera (i.e., the second camera device 1044), a trigger signal for the reference camera (i.e., the first camera device 1042), and a trigger signal for UV LED light (i.e., the invisible light source 1022). Each of the dashed boxes in the figure indicates one group of trigger signals. A capture period of the reconstruction camera is within a period that the invisible light source 1022 is on, while a capture period of the reference camera occurs in a period that the invisible light source 1022 is off. Accordingly, the reconstruction camera can capture the light emitted by the fluorescent ink of the invisible markers, but the reference camera cannot. In some embodiments, when there are a plurality of reconstruction cameras, reference cameras, and/or UV LED lights, each of the trigger signals are applied to the same type of devices simultaneously. For example, the plurality of reconstruction cameras are configured to capture the scene in response to the same trigger signal and their shutter may open at the same time.

It can be understood that although the trigger signal for the reference camera occurs before the trigger signal for the UV LED light occurs in the group shown in FIG. 4, it may also after the trigger signal for the UV LED light occurs in other embodiments. Further, it can be understood that the trigger scheme for the UV LED light can be applied for other invisible light source, such as infrared UV light.

In some embodiments, a trigger delay between the reference camera and the reconstruction camera is extremely short (for example, about 1 millisecond), so the motion of the target object between two corresponding frames (i.e., a frame captured by the reference camera and a frame captured by the reconstruction camera in response to the trigger signals of the same group) can be ignored. A correspondence relationship can be established for images captured by the first camera device 1042 and the second camera device 1044 in response to trigger signals of the same group. Accordingly, the 3D model data of the target object reconstructed from the second images captured by the second camera device 1044 can correspond to the first image captured by the first camera device 1042 based on the capturing timestamps and/or the trigger signal groups.

In some embodiments, before the scanning process, all the cameras of the first camera device 1042 and the second camera device 1044 are calibrated to obtain the positions and orientations of the cameras. The calibrated positions and orientations of the cameras are represented in a unified coordinate system and can be used in reconstruction process.

After the scanning process, a reconstruction process may be implemented. The data used in the reconstruction process may include: for example, image data including images captured by the first camera device 1042 and the second camera device 1044, correspondence relationship data indicating correspondences between first images and second images, calibration data including calibrated positions and orientations of the cameras of the first and second camera devices, and/or an object template for registration. The markers shown in the images can facilitate the reconstruction process to produce more accurate result. The reconstruction process may include 3D model reconstruction, template registration, pose estimation, and/or motion tracking.

During the reconstruction process, a 3D model of the target object can be recovered based on the images captured by the reconstruction cameras (e.g., by using a photogrammetry or multi-view stereo method). The 3D model can be represented by a point cloud and/or a mesh. The 3D model may also be referred as scanned model. In some embodiments, for each set of reconstruction images captured in response to a same trigger signal (i.e., reconstruction images of a same frame), a corresponding 3D model can be generated. Accordingly, the number of the recovered 3D models can be the same as the number of frames captured. Further, markers shown in the second images of the same frame can be matched to identify same feature of the target object under different viewing angles and facilitate the 3D model reconstruction. The point clouds and/or the meshes of the recovered 3D models can be represented in a same coordinate system. In some embodiments, the 3D models of the target object can be directly used in CG animation applications.

In some embodiments, the target object includes multiple parts that are scanned together, a point cloud and/or a mesh of the recovered 3D model can be segmented to obtain a 3D models for each part. The multiple parts may be painted with different types of invisible markers, such as different colors and/or shapes, and the segmentation can be performed by identifying colors or shapes of the markers and corresponding points or meshes. In other words, when the target object includes a first part painted with the invisible markers of a first type and a second part painted with the invisible markers of a second type, a 3D model of the first part and a 3D model of the second part can be identified according to the invisible markers of the first type and the invisible markers of the second type. For example, the target object may include a left hand painted with fluorescent blue markers and a right hand painted with fluorescent green markers, and a point cloud of the left hand and a point cloud of the right hand can be obtained by separating points corresponding to the blue markers and points corresponding to the green markers. In some other embodiments, the point clouds of the left and right hands can be separated based on a learning-based method.

Further, optical flows in the reconstruction images (e.g., reconstruction images of adjacent frames) can be computed. An optical flow corresponding to two frames (e.g., adjacent frames) tracks movements of the target object from a first frame to a second frame in the scanning process. For example, for each reconstruction camera, an optical flow can be computed using adjacent images of its own. In some embodiments, matching pixels of the invisible markers in two frames can be used to align the frames and obtain the optical flow, thereby increasing motion tracking accuracy. The computed optical flows can be projected back to the 3D space (e.g., the same 3D space as the recovered 3D models) to obtain a motion field of the target object.

The recovered 3D models and the motion field can be used to register an object template to the target object. The object template describes a same type of object as the target object. The object template may include shape and structure data, for example, meshes representing a surface appearance of the object, and points representing joints (e.g., connection points) of the object. A template registration method can be performed using the motion field as a constraint where the object template can be gradually adjusted to fit the scanned model. The output of the registration is 3D shape parameters and 3D pose parameters of the target object for each frame. Further, the 3D pose parameters of each frame can be warped to the reference image of the corresponding frame as both reference and reconstruction cameras are calibrated in a unified coordinate system. For example, a 3D object can be generated based on the output of the registration, points/vertices of the 3D object can be projected to the reference image based on the unified coordinates and reflect the pose on the reference image.

In some embodiments, the object template may include a left hand template and a right hand template. The left hand template and the right hand template can be separately registered to the left hand 3D model and the right hand 3D model.

In the field of body part model reconstruction, it is known that the human skin is usually texture-less and uniformly colored, which means it contains insufficient self-features, so it is difficult to find correspondences between images from different views, while camera registration and 3D reconstruction heavily relies on these correspondences. As disclosed herein, fluorescent markers are painted on the body part (e.g., human hand) to rich the features. With these markers, the reconstructed point cloud is denser and smoother, and produces less outliers. A model reconstruction with desired quality can be achieved. In some embodiments, the markers can also be used to identify the left hand and the right hand, and to separate their corresponding point clouds accordingly.

Compared with existing marker-less motion tracking systems, the disclosed scanning and reconstruction process can produce a better motion tracking result because a denser and more accurate motion filed can be defined on the point cloud to build the connections between adjacent frames. By using the markers, more matched pixels can be found in a sequence of images captured by the same camera, and these pixels are used for 3D reconstruction, hence a better motion field. Though some motion tracking systems use structured near infrared light to enhance the precision of 3D reconstruction, the markers generated by the light cannot move with the target object accordingly, which means the structured light is not helpful in the motion tracking situation.

Figure 5:
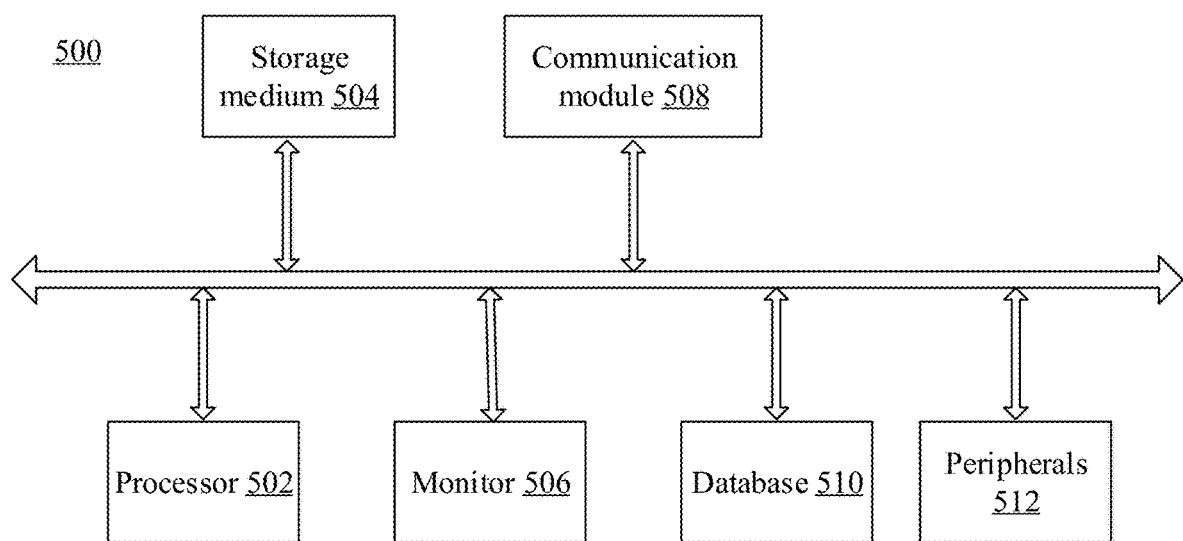
FIG. 5 illustrates a computer system consistent with embodiments of the present disclosure.

As disclosed, by using the motion field as a constraint in registration, some reconstruction problems can be overcome, such as the target object is self-occluded, some parts of the target object are twisted or overlayed. In existing technologies, registration may fail in cases that occlusion exist because points with different labels are often mixed. For example, when reconstructing a hand model, boundaries of the fingertips and the palm are blurred if they are touching each other. Types of the corresponding points (e.g., whether a point belongs to the fingertip or the palm) may not be identified correctly only based on analyzing the point clouds. In accordance with embodiments of the present disclosure, this problem can be solved by integrating information of the motion field with the point clouds to correctly identify types of the points FIG. 5 illustrates an exemplary computer system implementing certain aspects of the 3D object scanning system 100, the controller 106, and/or other computing device used for the disclosed calibration, scanning, and/or reconstruction process. As shown in FIG. 5, computer system 500 may include a processor 502, storage medium 504, a monitor 506, a communication module 508, a database 510, and peripherals 512. The components shown in FIG. 5 are illustrative, certain components may be omitted, and other components may be added.

Processor 502 may include any appropriate processor or processors. Further, processor 502 can include multiple cores for multi-thread or parallel processing. Processor 502 may be connected to other components through one or more bus or other electrical connections to send data to and receive data from the other components. Processor 502 may be implemented by using at least one hardware form of digital signal processing (DSP), a field-programmable gate array (FPGA), and a programmable logic array (PLA). Processor 502 may also include a main processor and a coprocessor. The main processor may be a central processing unit (CPU), and the coprocessor may be a graphics processing unit (GPU) configured to be responsible for rendering and drawing content that a display screen needs to display. Storage medium 504 may include memory modules, such as Read-only Memory (ROM), Random Access Memory (RAM), flash memory modules, and erasable and rewritable memory, and mass storages, such as CD-ROM, U-disk, and hard disk, etc. Storage medium 504 may store computer programs for implementing various processes, when executed by processor 502. Communication module 508 may include network devices for establishing connections through the communication link 240.

Peripherals 512 may include I/O devices such as a keyboard, a mouse, an audio input/out device to facilitate user interaction in the calibration, scanning, and/or reconstruction processes, such as designating trigger signal patterns, identifying image data to be used for reconstruction, etc. Peripherals 512 may also include connection ports compatible with components of the 3D object scanner 100. Database 510 may include one or more databases for storing certain data and for performing certain operations on the stored data, such as database searching. The data may include trigger signal patterns, images and corresponding attribute information obtained in the calibration and scanning process, geometry and material data obtained from the reconstruction process, algorithms directed to perform the calibration, scanning, and/or reconstruction processes, etc. Monitor 506 may be any suitable display technology suitable to display an image or video, a graphical user interface, etc. For example, monitor 506 may include a liquid crystal display (LCD) screen, an organic light-emitting diode (OLED) screen, or the like, and may be a touch screen.

The sequence numbers of the foregoing embodiments of the present disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of the present disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of the present disclosure.

In the foregoing embodiments of the present disclosure, descriptions of the embodiments have different emphases. As for parts that are not described in detail in one embodiment, reference can be made to the relevant descriptions of the other embodiments.

In the several embodiments provided in the present disclosure, it is to be understood that the disclosed client can be implemented in other manners. The apparatus embodiments described above are merely exemplary. For example, the division of the units is merely the division of logic functions and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of the present disclosure can be integrated into one processing unit, or each of the units can exist alone physically, or two or more units are integrated into one unit. The foregoing integrated unit can be implemented in the form of hardware or can be implemented in the form of a software function unit.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A three-dimensional (3D) object scanning method, comprising:
   controlling, when an invisible light source is off in a first period of a capturing cycle, a first camera device to capture a first image of the target object, the target object being painted with invisible markers that are invisible to the first camera device when the invisible light source is off;
   controlling, when the invisible light source is on in a second period of the same capturing cycle, a second camera device to capture a second image of the target object, the invisible markers being visible to the second camera device upon absorbing a light emitted by the invisible light source, wherein the second image is to determine 3D information of the target object; and
   pairing the 3D information of the target object corresponding to the second image of the capturing cycle and the first image of the same capturing cycle to form a training sample for training a gesture recognition model.

2. The method according to claim 1, wherein a wavelength of the light emitted by the invisible light source is in an excitation wavelength range of a fluorescent dye of the invisible markers.

3. The method according to claim 2, wherein the wavelength of the light emitted by the invisible light source is in an ultraviolet light spectrum.

4. The method according to claim 3, wherein a wavelength of the light emitted by the invisible light source is in a range from 315 to 400 nanometers.

5. The method according to claim 2, wherein the wavelength of the light emitted by the invisible light source is in an infrared light spectrum.

6. The method according to claim 1, wherein the invisible markers include multiple types of markers to indicate different attributes of the target object.

7. The method according to claim 6, wherein the multiple types of markers are different in at least one of a color or a shape.

8. The method according to claim 6, wherein the different attributes of the target object include at least one of: anatomical parts of the target object, skeleton or non-skeleton parts of the target object, or joint or non-joint parts of the target object.

9. The method according to claim 1, further comprising:
controlling the first camera device and the second camera device to capture image sets of the target object in a plurality of capturing cycles, each image set including the first image and the second image corresponding to the capturing cycle.

10. The method according to claim 9, further comprising: in one of the plurality of capturing cycles:
in response to a first trigger signal, controlling the first camera device to capture the first image of the target object;
in response to a second trigger signal, controlling the invisible light source to emit light for a duration; and
in response to a third trigger signal, controlling the second camera device to capture the second image of the target object within the duration indicated by the second trigger signal.

11. The method according to claim 10, further comprising:
generating the first trigger signal at a first moment and generating the second trigger signal at a second moment; and
a time interval between the first moment and the second moment is less than an interval threshold.

12. The method according to claim 11, further comprising:
tracking a motion of the target object in the plurality of capturing cycles according to matching pixels corresponding to the invisible markers in a plurality of second images captured by the second camera device.

13. The method according to claim 1, further comprising:
reconstructing a 3D model of the target object according to matching pixels corresponding to the invisible markers in a plurality of second images captured by the second camera device.

14. The method according to claim 13, wherein the target object comprises a first part painted with the invisible markers of a first type and a second part painted with the invisible markers of a second type, and the method further comprises:
identifying a 3D model of the first part and a 3D model of the second part according to the invisible markers of the first type and the invisible markers of the second type.

15. The method according to claim 1, wherein the first camera device and the second camera device are different.

16. The method according to claim 1, wherein a plurality of second images of the target object in the same capturing cycle are captured by the second camera device from a plurality of viewing angles.

17. The method according to claim 16, wherein:
the first image of the target object is captured by the first camera device from a first orientation;
the plurality of second images of the target object in the same capturing cycle are captured by the second camera device from a plurality of second orientations corresponding to the plurality of viewing angles; and
the first orientation corresponding to capture of the first image is different from one of the plurality of second orientations corresponding to capture of the second images.

18. A three-dimensional (3D) object scanner, comprising:
a first camera device;
a second camera device;
an invisible light source configured to emit a light onto a target object, the target object being painted with invisible markers that are invisible to the first camera device when the invisible light source is off, and the invisible markers being visible to the second camera device upon absorbing the light emitted by the invisible light source; and
a controller configured to:
control an on/off status of the invisible light source;
control, when the invisible light source is off in a first period of a capturing cycle, the first camera device to capture a first image of the target object from a first orientation;
control, when the invisible light source is on in a second period of the same capturing cycle, the second camera device to capture a second image of the target object, wherein the second image is used to determine 3D information of the target object; and
pair the 3D information of the target object corresponding to the second image of the capturing cycle and the first image of the same capturing cycle to form a training sample for training a gesture recognition model.

19. The 3D object scanner according to claim 18, wherein a wavelength of the light emitted by the invisible light source is in an ultraviolet light spectrum or an infrared light spectrum.

20. The 3D object scanner according to claim 18, wherein the invisible markers include multiple types of markers to indicate different attributes of the target object, and the multiple types of markers are different in at least one of a color or a shape.

21. The 3D object scanner according to claim 18, wherein the controller is further configured to:
control the first camera device and the second camera device to capture image sets of the target object in a plurality of capturing cycles, each image set including the first image and the second image corresponding to the same capturing cycle.

22. The 3D object scanner according to claim 21, wherein the controller is further configured to: in one of the plurality of capturing cycles:
generate a first trigger signal to control the first camera device to capture the first image of the target object;
generate a second trigger signal to control the invisible light source to emit light for a duration; and
generate a third trigger signal to control the second camera device to capture the second image of the target object within the duration indicated by the second trigger signal.

23. The 3D object scanner according to claim 18, wherein the second camera device includes a plurality of second cameras disposed on a support structure that surrounds the target object.

24. The 3D object scanner according to claim 23, wherein the support structure has a cylinder shape or a dome shape.

25. The 3D object scanner according to claim 23, the first camera device includes at least one of: a first camera disposed in front of the target object, or a first camera disposed on top of the target object.

26. A non-transitory storage medium storing computer instructions that, when executed by at least one processor, causing the at least one processor to perform:
controlling an on/off status of an invisible light source, the invisible light source being configured to emit a light onto a target object, the target object being painted with invisible markers that are invisible to a first camera device when the invisible light source is off, and the invisible markers being visible to a second camera device upon absorbing the light emitted by the invisible light source;

controlling, when the invisible light source is off in a first period of a capturing cycle, the first camera device to capture a first image of the target object;

controlling, when the invisible light source is on in a second period of the same capturing cycle, the second camera device to capture a second image of the target object, wherein the second image is are used to determine 3D information of the target object; and pairing the 3D information of the target object corresponding to the second image of the capturing cycle and the first image of the same capturing cycle to form a training sample for training a gesture recognition model.

* * * * *